(12) United States Patent
Cocquet et al.

(10) Patent No.: US 10,119,050 B2
(45) Date of Patent: Nov. 6, 2018

(54) ADHESIVE SEALING COMPOSITION

(71) Applicant: Arkema France, Colombes (FR)

(72) Inventors: Clio Cocquet, Serquigny (FR); Betty Laurent, Barc (FR); Samuel Devisme, Rouen (FR)

(73) Assignee: ARKEMA FRANCE, Colombes (FR)

( * ) Notice: Subject to any disclaimer, the term of this patent is extended or adjusted under 35 U.S.C. 154(b) by 140 days.

(21) Appl. No.: 15/317,272

(22) PCT Filed: Jun. 9, 2015

(86) PCT No.: PCT/FR2015/051517
§ 371 (c)(1),
(2) Date: Dec. 8, 2016

(87) PCT Pub. No.: WO2015/197933
PCT Pub. Date: Dec. 30, 2015

(65) Prior Publication Data
US 2017/0137676 A1    May 18, 2017

(30) Foreign Application Priority Data

Jun. 26, 2014 (FR) .................................. 14 55949

(51) Int. Cl.
*C09J 123/08* (2006.01)
*B32B 15/082* (2006.01)
(Continued)

(52) U.S. Cl.
CPC ........... *C09J 123/0869* (2013.01); *B32B 7/12* (2013.01); *B32B 15/082* (2013.01);
(Continued)

(58) Field of Classification Search
CPC .......... C08L 23/00–23/36; C08L 33/00–33/26; C08L 93/04; C09J 123/00–123/36; C09J 11/06; C08K 5/0008; C08K 5/20
See application file for complete search history.

(56) References Cited

U.S. PATENT DOCUMENTS

| | | |
|---|---|---|
| 4,276,111 A | 6/1981 | Karim et al. |
| 7,495,048 B2 | 2/2009 | Van den Bossche et al. |
| 2006/0014022 A1 | 1/2006 | Kendig et al. |

FOREIGN PATENT DOCUMENTS

| | | |
|---|---|---|
| EP | 0 547 798 A1 | 6/1993 |
| EP | 2 166 034 A2 | 3/2010 |

(Continued)

OTHER PUBLICATIONS

Machine translation of JPH01-311144. Retrieved Jul. 11, 2018.*
(Continued)

*Primary Examiner* — Prashant J Khatri
(74) *Attorney, Agent, or Firm* — Buchanan Ingersoll & Rooney P.C.

(57) ABSTRACT

An adhesive composition that can be used in an extrusion-coating process for application to a support or in an extrusion-laminating process in order to bond several supports of different or identical nature to one another, over a wide temperature range, including: from 91% to 98% by weight of the composition, of a copolymer of ethylene and of alkyl acrylate; at least one tackifying resin; processing aids, wherein the tackifying resin represents between 1.5% and 5.5% of the weight of the composition and the processing aids represent between 0.5% and 3.5% of the weight of the composition and the anti-blocking agent represents, in the processing aids, at least 60% by weight of the aids. Also, a film of the composition and a multilayer structure that includes this film.

10 Claims, 1 Drawing Sheet

Adhesive bonding result on cooling : ++++

(51) Int. Cl.
- B32B 15/085 (2006.01)
- B32B 15/09 (2006.01)
- C09J 11/06 (2006.01)
- B32B 7/12 (2006.01)
- B32B 27/30 (2006.01)
- B32B 27/32 (2006.01)
- B32B 27/36 (2006.01)
- B32B 37/15 (2006.01)
- B32B 15/20 (2006.01)
- B32B 27/08 (2006.01)
- B32B 27/10 (2006.01)
- B32B 27/34 (2006.01)
- C08L 23/08 (2006.01)
- C09J 123/10 (2006.01)

(52) U.S. Cl.
CPC ............ *B32B 15/085* (2013.01); *B32B 15/09* (2013.01); *B32B 15/20* (2013.01); *B32B 27/08* (2013.01); *B32B 27/10* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 37/153* (2013.01); *C08L 23/0869* (2013.01); *C09J 11/06* (2013.01); *B32B 2311/24* (2013.01); *B32B 2323/10* (2013.01); *B32B 2325/00* (2013.01); *B32B 2333/08* (2013.01); *B32B 2367/00* (2013.01); *B32B 2405/00* (2013.01); *C09J 123/10* (2013.01)

(56) References Cited

FOREIGN PATENT DOCUMENTS

| JP | 01311144 A | * 12/1989 | |
| WO | WO-2005071009 A1 | * 8/2005 | ............ B32B 27/08 |

OTHER PUBLICATIONS

*International Search Report (PCT/ISA/210) dated Aug. 26, 2015, by the European Patent Office as the International Searching Authority for International Application No. PCT/FR2015/051517.

* cited by examiner

Figure 1a
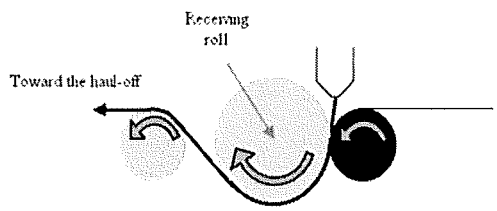
Figure 1b
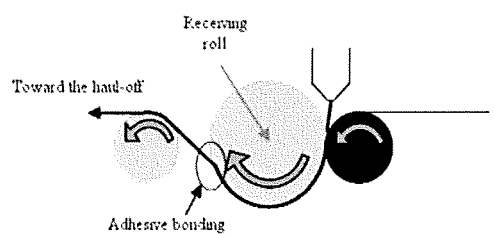
Figure 1c
Figure 1d
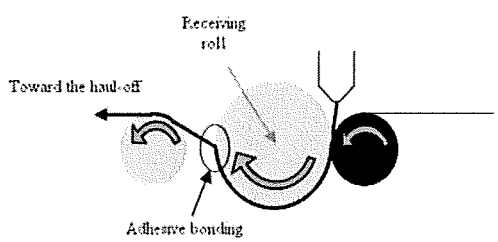
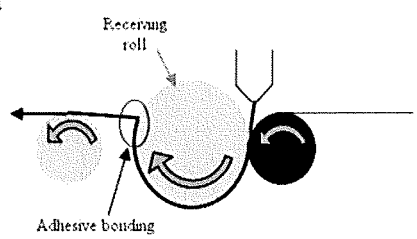
Figure 1e
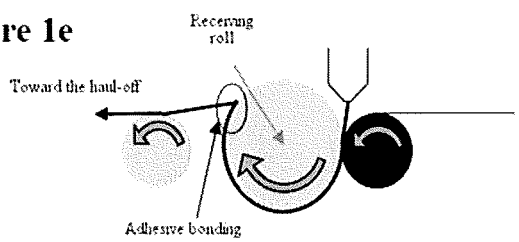

ADHESIVE SEALING COMPOSITION

FIELD OF THE INVENTION

The present invention relates to an adhesive or binder composition based on a copolymer of ethylene and an alkyl acrylate which can be used in an extrusion-coating process with application to a support or in an extrusion-lamination process for adhesively bonding together several supports which may or may not be different in nature, it being possible for one of these supports to be a thermoplastic or a metal, such as, in particular, aluminum.

The invention thus also relates to a sealing film consisting of this adhesive composition or to a multilayer structure including the support and said sealing film.

STATE OF THE ART

Subsequently, "sealing" is understood to mean the union of two surfaces of a film or of two layers, whatever their nature.

There exists a great variety of packagings for foodstuffs, such as, for example, peelable-opening packagings. These peelable-opening packagings can be produced by sealing a cover to a container, it being possible for the containers to be composed of different materials and in particular different polymers (polystyrene, polyether terephthalate, polyethylene, polypropylene, and the like). The covers have to have a sufficiently strong adhesion to the container to prevent the unexpected opening of the packaging but also sufficiently weak to be peelable.

The covers are multilayer structures and generally consist of several layers, including at least the adhesive sealing (peelable) layer and the "mechanical" layer, conventionally made of polymer, paper or aluminum. These covers can be produced by extrusion-coating or by thermal lamination of a film obtained in blown film extrusion.

The production of this cover is subject to several processability problems:
- the adhesive bonding to the chill roll during production by extrusion-coating,
- the problem of film opening during the manufacture of the film by film blowing,
- the blocking and the slipping of the film produced by film blowing (also obtained for example, by a flat die, extrusion-coating or lamination) during the manipulation of the reels before and during thermal lamination.

The blocking and the slipping are problems specific to film production which are well known to a person skilled in the art. Thus, the use of slip agents in films makes it possible to reduce the Coefficient of Friction (COF) while retaining the optical properties of gloss, transparency and clarity, whereas the use of antiblock agents makes it possible to create, at the surface of the film, nodules that facilitate the sliding of the film on all types of supports.

In order to overcome these processability problems, it is known to a person skilled in the art that it is necessary to add, to the adhesive sealing layer, processing additives, that is to say slip and antiblock agents.

The formulation of the adhesive sealing (peelable) layer depends on the container on which it is desired to seal the cover. It is known to a person skilled in the art that the addition of tackifying resin to polyethylene (PE), polypropylene (PP) or a copolymer of ethylene and vinylacetate (EVA) makes it possible to obtain a sealing resin formulation, the sealing performance of which is excellent on many types of support. The documents U.S. Pat. No. 7,495,048 or EP 2 166 034 illustrate this state of knowledge.

The document U.S. Pat. No. 7,495,048 describes a sealing resin composition comprising:
- from 75% to 99% by weight of a copolymer of ethylene and of an unsaturated ester, preferably an EVA exhibiting a vinyl acetate content of greater than 5%,
- from 5% to 20% by weight of a tackifying resin having a high softening point.

These compositions make it possible to lower the minimum sealing temperature.

The contents of tackifying resin preferably used are between 5% and 20%. In point of fact, with such contents of tackifying resins, two types of problems occur:
- a problem of thermal stability at the processing temperatures related to the presence of the tackifying resin,
- a loss of transparency related to the high additivation (addition of processing additives, namely antiblock agents and slip agents) necessary to overcome the processing problems. This is because the addition of tackifying resins renders the peelable sealing resin formulation very tacky, which results in the problems of adhesive bonding to the chill roll in extrusion-coating or of film opening in film blowing. As stated above, it is known to a person skilled in the art that, with the aim of overcoming these problems, a high additivation (processing additives) is necessary but this additivation is harmful to the transparency of the composition.

Thus, there is currently a search to find an adhesive sealing thermoplastic composition not exhibiting the disadvantages targeted above while retaining the good properties obtained with the adhesive compositions of the prior art.

BRIEF DESCRIPTION OF THE INVENTION

Surprisingly, the applicant has discovered that the combination of a specific type of copolymer with at least one tackifying resin and also processing additives in a specific ratio, in particular for antiblock agents and slip agents, makes it possible to obtain an adhesive sealing (peelable) composition exhibiting all the properties of the adhesive compositions according to the prior art while overcoming the disadvantages, essentially in terms of processability and of transparency of the composition, of these compositions.

This discovery runs counter to what might be sensed by a person skilled in the art as a person skilled in the art would not envisage decreasing the content of tackifying resin as he knows that this decrease would undoubtedly be harmful to the sealing properties of the composition. In point of fact, the adhesive composition according to the invention, containing less than 5% (or optionally 5% inclusive) of tackifying resin, makes it possible to retain good sealing properties while maintaining the good thermal stability and optical properties desired.

The present invention thus relates to an adhesive composition, usable in an extrusion-coating process for application to a support or in an extrusion-lamination process for adhesively bonding together several supports which are or are not different in nature, within a broad temperature range, comprising:
- from 91% to 98% by weight of said composition of a copolymer of ethylene and of alkyl acrylate;
- at least one tackifying resin;
- processing additives comprising at least one antiblock agent and one slip agent, characterized in that the tackifying resin represents between 1.5% and 5% of the weight of the composition and said additives represent between 0.5% and 3.5% of the weight of the composition and in that the antiblock agent represents, in the processing additives, at least 60% by weight of said additives.

Other characteristics or embodiments of the invention are presented below:

advantageously, the tackifying resin represents between 3% and 4% of the weight of the composition;

preferably, the acrylate content in the copolymer of ethylene and of alkyl acrylate is between 15% and 30% of the weight of said copolymer;

preferably, the copolymer of ethylene and of alkyl acrylate consists of a copolymer of ethylene and of methyl acrylate;

according to a specific feature of the invention, the MFI of the above said copolymer is between 5 g/10 min and 15 g/10 min (at 190° C., 2.13 kg);

advantageously, the processing additives are present at between 1.5% and 2.5% by weight of said composition;

preferably, the processing additives consist solely of at least one antiblock agent and at least one slip agent, the antiblock agent representing at least 70% by weight of said additives;

according to one embodiment, the composition according to the invention consists solely of the above said copolymer, the above said tackifying resin and said processing additives.

The invention also relates to a sealing film consisting of a composition as presented above, characterized in that its thickness is between 10 and 20 micrometers (μm).

The present invention also relates to a multilayer structure comprising at least two films, one of which is the above-mentioned sealing film, characterized in that the second film is chosen from aluminum, paper or board, cellophane, films based on polyethylene, polypropylene, polyamide, polyester, polyvinyl chloride (PVC), polyvinylidene chloride (PVDC) or polyacrylonitrile (PAN) resins, these films being or not being oriented, being or not being metallized and being or not being treated physically or chemically, and films coated with a thin inorganic barrier layer, such as polyester (PET SiOx or AlOx).

DESCRIPTION OF THE APPENDED FIGURES

The description which will follow is given solely by way of illustration and without limitation with reference to the appended figures, in which:

FIGS. 1a to 1e illustrate one of the tests and the measurements of this test consisting of the adhesive bonding of the test specimens to a chill roll.

DETAILED DESCRIPTION OF THE INVENTION

As regards the copolymer of ethylene and of acrylate, an alkyl(meth)acrylate may be concerned, it being possible for the alkyl group to have up to 24 carbon atoms. Mention may be made, as nonlimiting examples for this copolymer of ethylene and of acrylate, of $C_1$-$C_8$ (of 1 to 8 carbon atoms) acrylates or alkyl acrylates, such as $C_1$-$C_8$ alkyl(meth)acrylate, n-butyl or isobutylacrylates and methyl ethyl methacrylate.

It has been noted, by the applicant, that even better results are obtained, in the context of the objectives of the present patent application, with copolymers in which the content of alkyl acrylate represents between 15% and 30% of the weight of the copolymer.

It should also be noted that the compositions below all exhibit MFI (Melt Flow Index) values at 12 g/10 min (at 190° C., 2.13 kg) but the applicant has furthermore demonstrated that the MFI of the chosen copolymer has to lie between 5 g/10 min and 15 g/10 min (at 190° C., 2.13 kg) in order for the objectives of the invention to be able to be achieved.

As regards the tackifying resin, it concerns polymers exhibiting a number-average molecular weight of less than or equal to 10 000 g·mol$^{-1}$ (gram per mol) chosen from the three following types of resins (polymers):

hydrogenated and dimerized acid or ester type rosin resin;

aliphatic, hydrogenated aliphatic, aromatic, hydrogenated aromatic, aliphatic/aromatic, hydrogenated aliphatic/aromatic, cycloaliphatic, hydrogenated cycloaliphatic, cycloaliphatic/aromatic and hydrogenated cycloaliphatic/aromatic type hydrocarbon resins;

polyterpene and terpene-phenol type terpene resin.

As regards the processing additives, in the context of the present invention, they are specifically and solely of two natures, namely antiblock agents and slip agents.

Antiblock agent is understood to mean the fact that such an additive makes it possible to reduce the adhesion between two polymer surfaces. The antiblock agents according to the present can consist of components of organic type, such as behenamide, stearamide, ethylenebis-oleamide or ethylene bis-stearamide, or components of inorganic type, such as silica, talc, calcium carbonate, kaolin or clay.

Slip agent is understood to mean the fact that such an additive makes it possible to reduce the coefficient of friction of the product to which it is added. The antiblock agents according to the present can consist of erucamide, oleamide, oleylpalmitamide and stearylerucamide.

It should be noted that, in the continuation, the invention is illustrated with just one type of tackifying resin, namely Régalite R1125, but the applicant has shown that the invention would also function with one of the abovementioned tackifying resins.

The adhesive composition according to the present is prepared according to methods well known to a person skilled in the art. As nonlimiting example, such an adhesive composition can be conventionally obtained by corotating twin-screw extrusion.

A multilayer structure comprising a film of a composition according to the present invention is obtained without difficulty by a person skilled in the art according to one of the well known methods, such as, for example, extrusion-lamination. Although this synthesis route, namely extrusion-lamination, is particularly suitable for forming a film of composition according to the invention or a multilayer incorporating such a film, the present invention is not limited to this method of synthesis and can, for example, be envisaged in a process of preparation by thermal lamination of a film obtained by film blowing.

Preparation of the Formulations of the Test Compositions:

The test specimens of compositions, according to the invention and according to the prior art, are produced exactly according to one and the same process. This is because a cover, that is to say a multilayer including the test composition, is produced. These covers are produced by coextrusion-coating on aluminum on a Collin® laboratory line.

For the main peel test, the structures of all the test specimens are exactly the same, with the exception, of course, of the adhesive composition to be tested. Thus, the structure of these covers consists of aluminum 37 µm/binder 6 µm/adhesive composition 15 µm.

There are many physicochemical properties to be tested for an adhesive sealing composition. In the case in point, the tests carried out and presented below include the peel test, the measurement of the blocking, the measurement of the static and dynamic coefficients of friction, the haze, the adhesive bonding to a chill roll and thermal stability tests.

Tests Carried Out:

Peel Test

The peel forces are measured after sealing the cover (different test specimens targeted above) on different supports. A welding of a cover to a polymer sheet representing the container (in particular polystyrene, polyetherterephthalate, and the like) is carried out using an AINPACK® cover sealing machine (heat sealer). The width of the clamping jaws is 3 millimeters (mm).

The sealing conditions are:
Pressure applied: 2.26 N/mm$^2$
Sealing time: 1 second
Variable temperature: 130° C., 160° C., 180° C., 200° C. and 220° C.

After conditioning of the "cover-sealed samples" in an atmosphere at 50% RH (Relative Humidity) and 23° C. for at least 24 hours, peeling of the test specimens is carried out at a constant rate (100 mm/minute) via a Synergie 200H dynamometer equipped with a 100 N force cell and with a 90° plate.

Measurement of the Blocking of the Test Specimens

The blocking is measured on a monolayer film of an adhesive composition, according to the present invention or according to the prior art, with a thickness of 50 µm (micrometers) by extrusion-coating according to the standard ISO 115-02 entitled "Plastics—Film and sheeting—Determination of blocking resistance".

Measurement of the Static and Dynamic Coefficient of Friction of the Test Specimens The static and dynamic coefficients of friction are measured on a monolayer film of an adhesive composition, according to the invention and according to the prior art, with a thickness of 50 µm produced by extrusion-coating according to the standard ASTM D 1894 entitled "Standard test method for static and kinetic coefficients of friction of plastic film and sheeting".

Haze Test

The haze is measured on a monolayer film of an adhesive composition, according to the invention and the prior art, with a thickness of 50 µm, produced by extrusion-coating according to the standard ASTM D-1003-007 entitled "Standard test method for haze and luminous transmittance of transparent plastics".

Measurement of the Adhesive Bonding of the Test Specimens to a Chill Roll

Adhesive bonding to a chill roll is evaluated during the preparation by extrusion-coating of a test specimen cover. The more the cover is separated at the top of the chill roll, the greater is the adhesive bonding. More specifically, a force intended to pull the film present on the chill roll is exerted and the ease of drawing of the film is measured. In order to clearly grasp this test and the measurement which results therefrom, the appended FIG. 1 makes it possible to clearly understand the principle of the test and of its measurement, even if it is clearly understood that a person clearly knows this procedure.

Thermal Stability Test

The analyses are carried out by Thermogravimetric clay analysis (TCA) according to the following procedures:

Dynamic Measurement:

The measurements are carried out on the Netzsch TG 209F1 device

Heating from 25 to 600° C. at 10° C./min under air and nitrogen

Isothermal Measurement:

The measurements are carried out on the Netzsch TG 209F1 device

Heating from 25 to 230, 250, 280 and 300° C. at 50° C./min and then an isotherm under nitrogen Starting Materials of the Test Compositions:

Lotryl® 20MA08: Ethylene/methyl acrylate copolymer, the acrylate content of which is 20% by weight of the copolymer and the MFI of which is 8 g/10 min (190° C., 2.13 kg). In the tables of results presented below, this Lotryl® is denoted by the initials 20MA08.

Lotryl® 40MA10: Ethylene/methyl acrylate copolymer, the acrylate content of which is 40% by weight of the copolymer and the MFI of which is 8 g/10 min (190° C., 2.13 kg). In the tables of results presented below, this Lotryl® is denoted by the initials 40MA08.

Lotryl® 10MA08: Ethylene/methyl acrylate copolymer, the acrylate content of which is 10% by weight of the copolymer and the MFI of which is 8 g/10 min (190° C., 2.13 kg). In the tables of results presented below, this Lotryl® is denoted by the initials 10MA08.

Tackifying resin (commercial): Tackifying resin of low molecular weight which is completely hydrogenated and which has a softening point of 123° C. In the tables of results presented below, the tackifying resin is denoted by the initials TR.

Talc 10MOOS sold by Imerys. This processing agent performs the function both of antiblock agent and of slip agent. This component is subsequently denoted talc.

EBS: Ethylene bis-stearamide supplied by Croda. This processing agent is an antiblock agent. This component is subsequently denoted EBS.

Er: Erucamide supplied by Croda. This processing agent is a slip agent. This component is subsequently denoted Er.

The processing additives are mixed in order to constitute three additivations, the first additivation representing 1% of the weight of the adhesive composition, the second additivation representing 2% of the weight of the adhesive composition and the third representing 4.5% of the weight of the adhesive composition.

Additivation a: 0.25% Er+0.25% EBS+0.5% talc
Additivation b: 0.5% Er+0.5% EBS+1% talc
Additivation c: 1% Er+1% EBS+2.5% talc Results of the Tests:

The adhesive sealing composition has to exhibit certain advantageous characteristics.

The results relating to an adhesive composition according to the present invention are given here nonexhaustively. In this context, four characteristics were more particularly targeted, namely:

the haze has to be less than 15, ideally less than or equal to 12; and
the adhesive bonding to the chill roll, denoted CR below, during the preparation by extrusion-coating has to be low (denoted "−");
the limiting film opening temperature is at least 100° C.;
the dynamic coefficient for the slip and the static coefficient for the slip has to be at least 0.4;
the blocking has to be at at least 150 grams.

| Formulation | Haze | Adhesive bonding to the CR | Limiting film opening T° C. | Ks | Kd | Blocking |
|---|---|---|---|---|---|---|
| 20MA08 | 5 | + | 85 | NM | NM | 640 |
| 20MA08 + additivation a | 8 | − | 95 | 0.43 | 0.41 | 44 |
| 20MA08 + additivation b | 12 | − | 105 | 0.25 | 0.24 | 24 |
| 20MA08 + additivation c | 40 | − | 105 | 0.21 | 0.18 | 23 |
| 20MA08 + 3.5% TR | 6 | ++ | 78 | NM | NM | NM |
| 20MA08 + 3.5% TR + additivation b | 11 | − | 105 | 0.4 | 0.42 | 70 |
| 40MA08 + 3.5% TR + additivation b | 12 | − | 104 | 0.62 | 0.59 | 76 |
| 10MA08 + 3.5% TR + additivation b | 11 | − | 107 | 0.35 | 0.39 | 65 |
| 20MA08 + 5% TR + additivation b | 10 | + | 102 | 0.41 | 0.44 | 170 |
| 20MA08 + 2% TR + additivation b | 12 | − | 108 | 0.32 | 0.31 | 40 |
| 20MA08 + 6% TR + additivation b | 10 | + | 95 | NM | NM | 564 |
| 20MA08 + 10% TR | 7 | +++ | 72 | NM | NM | NM |
| 20MA08 + 10% TR + additivation c | 40 | − | 100 | 0.39 | 0.40 | 210 |

NM: Not measurable

The propagation forces obtained during the sealing of the cover on a PET (polyether terephthalate) container. It is found during this test that the propagation values are virtually identical, whether the resin is at a content of 10% or at contents within the range of the invention.

Tests were also carried out on other types of supports, in particular on polystyrene and polypropylene, and showed results similar to those given in the table below.

Formulations No. 1 to No. 8 in the two tables below are respectively composed as follows:
No. 1: 20MA08+3.5% TR+additivation b
No. 2: 20MA08+5% TR+additivation b
No. 3: 20MA08+2% TR+additivation b
No. 4: 20MA08+6% TR+additivation b
No. 5: 40MA08+3.5% TR+additivation b
No. 6: 10MA08+3.5% TR+additivation b
No. 7: 20MA08+10% TR+additivation c
No. 8: 20MA08+additivation a

| Sealing temp. (° C.) | No. 1 | No. 2 | No. 3 | No. 4 | No. 5 | No. 6 | No. 7 | No. 8 |
|---|---|---|---|---|---|---|---|---|
| 130 | 2.5 | 2.7 | 2.6 | 2.4 | 2.7 | 2 | 2.4 | 1.7 |
| 145 | 2.8 | 2.9 | 2.8 | 2.7 | 2.9 | 2.3 | 2.7 | 2 |
| 160 | 3.3 | 3.2 | 3.2 | 3.4 | 3.4 | 2.7 | 3.3 | 2.3 |
| 180 | 3.4 | 3.3 | 3.4 | 3.3 | 3.4 | 3 | 3.4 | 2.4 |
| 220 | 3.5 | 3.4 | 3.5 | 3.3 | 3.4 | 3 | 3.5 | 2.5 |

The thermal stability is measured with the different indicators mentioned in the table below. The very marked gain in stability of the compositions according to the invention, with respect in particular to a composition exhibiting a content of tackifying resin at 10% by weight of the composition, is found.

| Formulation | Onset of degradation under air | Onset of degradation under $N_2$ | Loss during an isotherm of 1 hour under nitrogen | | | |
|---|---|---|---|---|---|---|
| | | | 230° C. | 250° C. | 280° C. | 300° C. |
| No. 1 | 330 | 398 | 0.60% | 0.82% | 1.31% | 1.53% |
| No. 2 | 317 | 370 | 0.75 | 1.31 | 2.72 | 3.14 |
| No. 3 | 335 | 402 | 0.42 | 0.62 | 0.93 | 1.02 |
| No. 4 | 314 | 363 | 0.86 | 1.43 | 3.2 | 4.26 |
| No. 5 | 316 | 370 | 0.76 | 1.47 | 2.78 | 3.08 |
| No. 6 | 331 | 400 | 0.59% | 0.81% | 1.30% | 1.50% |
| No. 7 | 310 | 350 | 1.3% | 2.2% | 4.5% | 6.2% |
| No. 8 | 337 | 409 | 0.22% | 0.26% | 0.35% | 0.52% |

The invention claimed is:

1. An adhesive composition, configured for use in an extrusion-coating process for application to a support or in an extrusion-lamination process for adhesively bonding together several supports which are or are not different in nature, the adhesive composition comprising:
   from 91% to 98% by weight of a copolymer of ethylene and of alkyl acrylate;
   at least one tackifying resin;
   processing additives comprising at least one antiblock agent and one slip agent,
   wherein the tackifying resin represents between 1.5% and 5% of the weight of the composition, wherein said additives represent between 0.5% and 3.5% of the weight of the composition, and wherein the antiblock agent represents, in the processing additives, at least 60% by weight of said processing additives.

2. The composition as claimed in claim 1, wherein the tackifying resin represents between 3% and 4% of the weight of the composition.

3. The composition as claimed in claim 1, wherein the acrylate content in the copolymer of ethylene and of alkyl acrylate is between 15% and 30% of the weight of said copolymer.

4. The composition as claimed in claim 1, wherein the copolymer of ethylene and of alkyl acrylate consists of a copolymer of ethylene and of methyl acrylate.

5. The composition as claimed in claim 1, wherein the MFI of the copolymer is between 5 g/10 min and 15 g/10 min at 190° C., 2.13 kg.

6. The composition as claimed in claim 1, wherein the processing additives are present at between 1.5% and 2.5% by weight of said composition.

7. The composition as claimed in claim 1, wherein the processing additives consist solely of at least one antiblock agent and at least one slip agent, the antiblock agent representing at least 70% by weight of said additives.

8. The composition as claimed in claim 1, wherein the composition consists of the copolymer, the tackifying resin and said processing additives.

9. A sealing film consisting of a composition as claimed in claim 1, wherein the sealing film has a thickness between 10 and 20 micrometers (μm).

10. A multilayer structure comprising at least two films, one of which is as claimed in claim 9, wherein the second film is chosen from aluminum, paper or board, cellophane, films based on polyethylene, polypropylene, polyamide, polyester, polyvinyl chloride (PVC), polyvinylidene chloride (PVDC) or polyacrylonitrile (PAN) resins, these films being or not being oriented, being or not being metallized and being or not being treated physically or chemically, and films coated with a thin inorganic barrier layer.

* * * * *